United States Patent [19]

Raulins et al.

[11] 4,433,862
[45] Feb. 28, 1984

[54] PIPE JOINT

[75] Inventors: George M. Raulins; George G. Grimmer, both of Dallas, Tex.

[73] Assignee: Otis Engineering Corporation, Dallas, Tex.

[21] Appl. No.: 456,526

[22] Filed: Jan. 7, 1983

Related U.S. Application Data

[63] Continuation-in-part of Ser. No. 367,952, Apr. 13, 1982.

[51] Int. Cl.³ .................... F16L 19/00; F16L 25/00; F16L 15/00
[52] U.S. Cl. ................... 285/350; 285/334; 285/332.3; 285/355; 285/390
[58] Field of Search .............. 285/334, 333, 332.2, 285/332.3, 355, 390, 350

[56] References Cited

U.S. PATENT DOCUMENTS

| | | | |
|---|---|---|---|
| 2,610,028 | 9/1952 | Smith | 285/14 X |
| 2,907,589 | 10/1959 | Knox | 285/332.2 X |
| 3,850,461 | 11/1974 | Fujioka et al. | 285/332.2 X |

FOREIGN PATENT DOCUMENTS

478477  1/1938  United Kingdom ............ 285/350

Primary Examiner—Richard J. Scanlan, Jr.
Attorney, Agent, or Firm—Vinson & Elkins

[57] ABSTRACT

A pipe joint in which a metal-to-metal seal is provided on the exterior of the pipe, a torque shoulder provides a further metal-to-metal seal and a still further seal is provided by a resilient ring. The box is protected against ballooning which might result in jump out of the threads by proportioning the thickness of the box at the point of seal at the maximum diameter of seal to the outer diameter of the box as compared to the full wall thickness of the pipe related to the outer diameter of the pipe.

20 Claims, 10 Drawing Figures

PIPE JOINT

This application is a continuation-in-part of my copending application Ser. No. 06/367,952, filed Apr. 13, 1982.

This invention relates to pipe joints and more particularly to joints to be used downhole in a producing well.

The invention may be used with drill pipe, tubing or a casing, all of which are referred to herein as "pipe".

The trend towards deeper and deeper wells, along with higher pressures and more severe environments found at these depths, has created a requirement for heavy wall tubular goods. The depths and pressures require high strength pipe; on the other hand, the severe $H_2S$ conditions require that the material be of low hardness. Low hardness inherently demands softer, and therefore, lower strength materials. Hence "ultra heavy walls" are required to develop the strengths needed.

To utilize the full pipe strength of these ultra heavy wall materials, connections must be developed that utilize as many of the required features of the pipe, while sacrificing as few features as possible. The desired features are that the connections develop full pipe strength and tensile strength, internal pressure rating, and collapse rating. The connection should also be able to withstand high temperatures and/or bending.

In accordance with this invention, the pipe joint is designed such that the box of the joint will have approximately the same internal pressure rating at the point of maximum metal-to-metal seal, that is, resistance to ballooning, as does the full wall thickness of the pipe between a pair of connectors. The thread system may be designed without regard to the seal surfaces between pipe and box and a step surface may joint the metal-to-metal seal system and the thread system.

It is frequently desirable to include in addition to the metal-to-metal seal in a pipe joint a secondary seal of plastic or resilient material.

In accordance with this invention, the pipe joint is designed such that a resilient or plastic seal may be utilized. Where a plastic material inert to well fluids is utilized which must be compressed to be effective, the invention provides for maintaining such material under compression without the plastic seal interfering with the normal engagement and sealing function of the metal-to-metal seal.

It is an object of this invention to provide a pipe joint in which the box is designed to have a resistance to ballooning equal to or greater than the pipe connected together by the pipe joint.

Another object is to provide a pipe joint in which the resistance to ballooning of the box at the maximum diameter of the metal-to-metal seal is at least equal to the resistance to ballooning of the pipe being connected together and the thread system may be designed for optimum strength without regard to the metal-to-metal seal.

Another object is to provide a pipe joint of the type having a metal-to-metal seal between the box and an external surface on the pipe in conjunction with a back-up seal of plastic material.

Another object is to provide a pipe joint having a metal-to-metal seal with a back-up seal of compressible material in which the material is placed under compression without interfering with the normal engagement and sealing of the metal-to-metal seal surfaces.

Another object is to provide a pipe joint having a metal-to-metal seal in conjunction with a back-up seal of compressible material in which, as the joint is made up, excess compressible material is extruded from the zone of the back-up seal until just before final make-up of the joint at which time the compressible material is confined and placed in compression during final make-up and in which means are provided for receiving the extruded material so that it will not reach the primary metal-to-metal sealing surfaces and possible interfere with their normal engagement and sealing functions.

Another object is to provide a pipe joint of the type having a primary metal-to-metal seal with a back-up seal of compressible material in which, as the joint is made up, excess compressible material is extruded from the back-up seal area after which a secondary metal-to-metal seal becomes effective to act as a secondary metal-to-metal seal for the joint and to confine the compressible material against further extrusion so that as the joint is finally made up, the material may be placed under substantial compression.

Another object is to provide a pipe joint as in the preceding object in which means are provided for receiving the extruded seal material so that it will not reach the area of the primary metal-to-metal seal and possibly interfere with full make-up and sealing of the metal-to-metal seal.

A pipe joint constructed in accordance with this invention will have a wall thickness at the greatest diameter section of the metal-to-metal seal such that this thickness relative to the diameter of the box is equal to or slightly greater than the ratio of the full wall thickness of the pipe to the diameter of the pipe.

Thus, the pipe will be constructed according to the relationship $tb/Db = tp/Dp$ wherein: tb is the thickness of the box wall at the largest diameter point of sealing engagement between the sealing surfaces in the box and on the outer diameter surface of the pipe, Db is the outer diameter of the box at the point where tb is measured, tp is the full wall thickness of the pipe, and Dp is the diameter of the pipe at the full wall thickness.

Other objects, features and advantages of the invention will be apparent from the drawing, the specification and the claims.

In the drawings wherein like reference numerals indicate like parts and illustrative embodiments of this invention are shown.

Figures 1, 2:
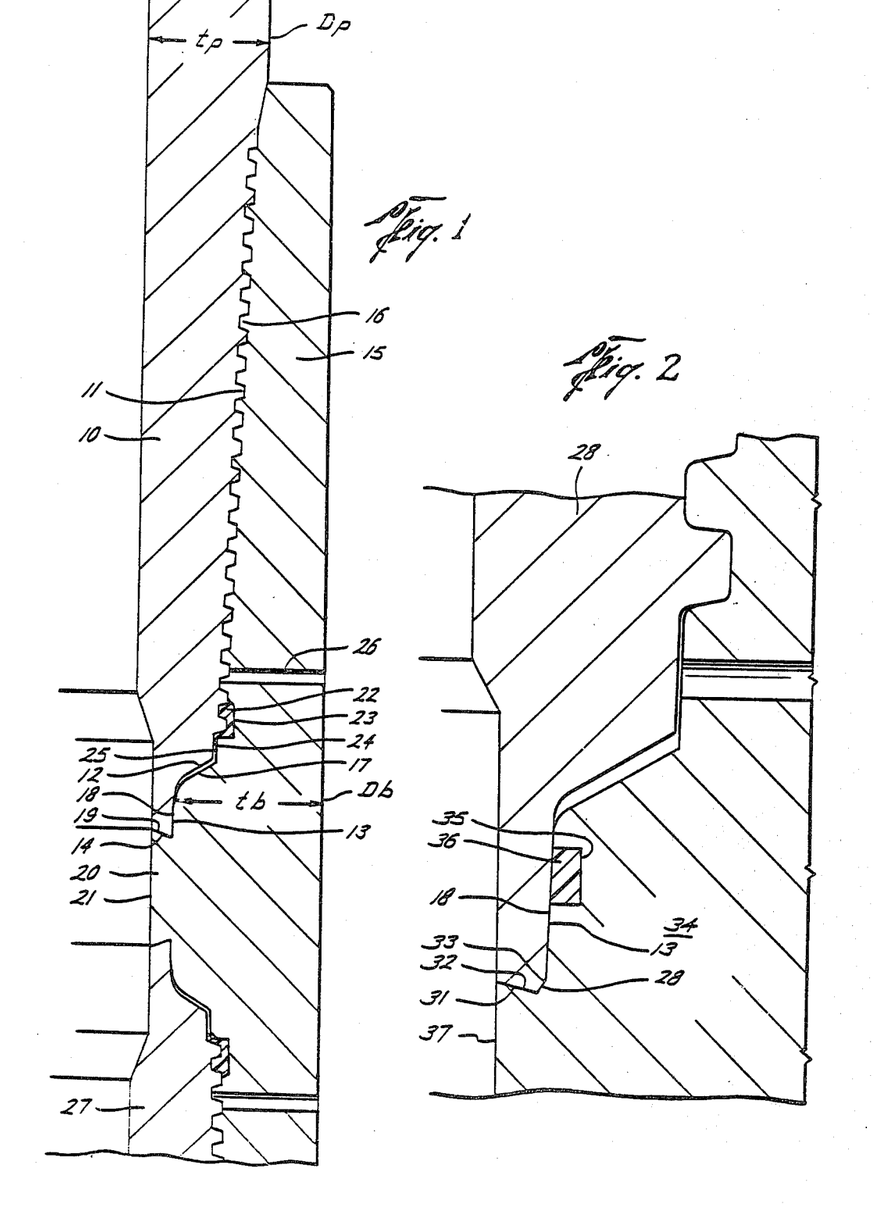
FIG. 1 is a quarter-section view of a pipe joint including a coupling between two pipes.
FIG. 2 is a fragmentary view on an enlarged scale of a modified form of pipe joint.

The pipe 10 is provided with an external tapered thread 11 thereon. Preferably, this thread is of the buttress type having its load bearing surface extending substantially normal to the center line of the pipe. In some instances, the taper of the threads may be that normally used, that is on the order of three-quarters of an inch per foot. In many instances, where very heavy wall pipe is used, it will be preferred to use a larger taper such as one and one-quarter inch per foot. The use of the steeper taper permits a shorter threaded section of the pipe and box of the coupling. The shorter threaded section in turn reduces the overall length of the coupling and permits greater control and accuracy in cutting threads and other surfaces.

Adjacent the smaller diameter end of thread 11, the outer diameter of the pipe steps down at 12 to a smaller diameter surface 13 which may be smaller than the diameter of the smallest box thread. This surface 13 is a sealing surface and extends annually about the pipe and longitudinally for a short distance adjacent the end of the pipe. This surface 13 should be contoured to result in a firm sealing contact with the box of the coupling when the joint is made up. For instance, the surface may be on a slight taper or it may be on a radius to provide the sealing contact.

Preferably, the pipe is stressed radially outwardly to ensure the sealing characteristics of the surface 13 and for this purpose, the end of the pipe 14 forms an acute angle with the surface 13. By way of example, the sealing surface 13 may be formed on an angle slightly less than 3° and the abutment surface 14 on an angle of approximately 15°.

The box 15 of the coupling will have an internal thread 16 complementary to and mating with the thread 11 on the pipe.

The box will step down at 17 to a smaller diameter sealing surface 18 which sealingly engages with the sealing surface 13 on the pipe.

The box is provided with a torque shoulder 19 extending inwardly from the seal surface 18 to the bore 21 through the coupling. The shoulder 19 should have a matching taper with the shoulder 14 on the end of the pipe which when the pipe is bottomed in the box, limits makeup of the pipe and box and preferably, due to its inclined surface, urges the pipe toward sealing position between the surfaces 13 and 18 which provide the primary seal. Also, the torque shoulder 19 and the end of the pipe 14 may provide a seal, particularly against external pressure.

In the illustrated embodiment, the surfaces 13 and 18 should seal along their entire engaged length. Due to the slight taper of the surfaces, the maximum diameter point of sealing engagement is their point of engagement remote from the abutment shoulder 19. This is the point of last metal-to-metal sealing engagement against pressure within the tubing.

In accordance with this invention, the box is designed such that its strength at this point of maximum sealing diameter resistant to ballooning is equal to or greater than the strength of the pipe to resist ballooning.

In accordance with this invention, the wall thickness (tb) of the box at the point of maximum diameter of the engaged and sealing surfaces 13 and 18 relative to the outer diameter (Db) of the coupling is approximately equal to or greater than the ratio of the full wall thickness of the pipe (tp) relative to the outer diameter of the pipe (Dp) so that the box will be as resistant to ballooning under internal pressure as will the pipe. This will prevent ballooning of the coupling and the possible resultant disengagement of the threads 11 and 16. Thus, so long as the seal provided by surfaces 13 and 18 remains effective, there should be no danger of the threads disengaging due to ballooning of the coupling.

In the form shown the internal diameter flange 20 results in a larger tb measured at the flange. As the flange is adjacent the point of maximum sealing of surfaces 13 and 18, the flange supports the sealing surfaces against ballooning, resulting in the coupling having a greater t/D ratio than the pipe.

Preferably, a resilient seal is provided by a plastic ring 22 in the groove 23 in the box. This ring is preferably of a plastic material such as tetrafluoroethylene. The groove 23 is positioned such that as the pipe is rotated to full make-up position, the small diameter end of thread of thread 11 enters the area of groove 22 and places the ring under substantial compression. The pipe has an annular surface 24 below thread 11 which overlies the seal 22 before the thread 11 begins to compress the seal 22. Preferably, the surface 24 on the pipe is spaced a slight distance from the complementary surface 25 in the box so that the plastic material would be permitted to flow under pressure into the space thus provided. Thus, the seal material forced into the space between surfaces 24 and 25 provides a primary plastic seal backed up by seal material in the thread 11 and groove 23. This plastic seal provides a back-up for the metal-to-metal seals.

It may be desirable to avoid any chance of pressure fluid from within the pipe joint reaching threads 11 and 16. In the makeup of the threads, dope is utilized which might result in a seal between the threads. If the other seals permitted fluid to flow into the threaded area, and a seal inadvertently occurred somewhere along the thread system, then the pressure from within the joint would be acting outwardly on the threaded section of the box and might result in disengagement of the threads due to ballooning of the threaded section of the box. To avoid this possibility, a bleed port 26 may be provided in the box, preferably immediately adjacent the resilient seal 22 so that any leakage of fluid past the seals would be vented to the exterior of the joint and would not cause ballooning of the threaded section of the box.

If desired, the surfaces 18 could be extended away from the torque shoulder 19 and a groove provided in this extended surface for the plastic seal. If the step 17 was of substantial dimension, this would position the plastic seal immediately adjacent the metal-to-metal seal and the value of tb would be approximately the same for the metal-to-metal seal and for the plastic seal.

The relative area of the torque shoulder 19 and the makeup torque should be such that the induced pressure on the shoulder 19 is substantially greater than the internal pressure to be sealed against. For deep high pressure wells, this induced pressure might be on the order of 30,000 to 50,000 psi.

Figure 3:
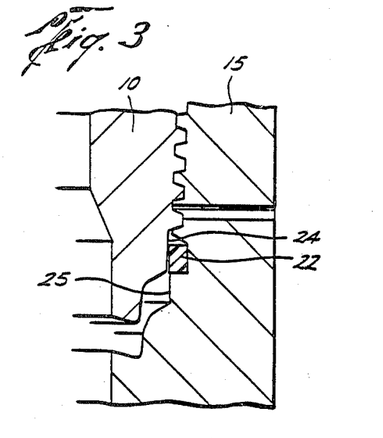
FIGS. 3, 4 and 5 are fragmentary quarter-section views showing sequentially the makeup of the pipe joint of FIG. 1.
Figure 4:
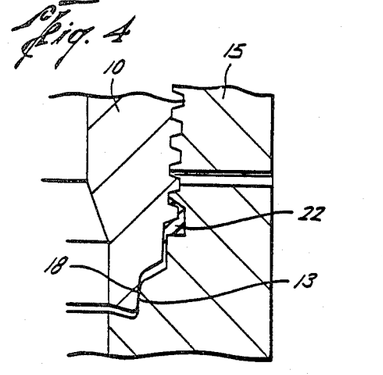
Figure 5:
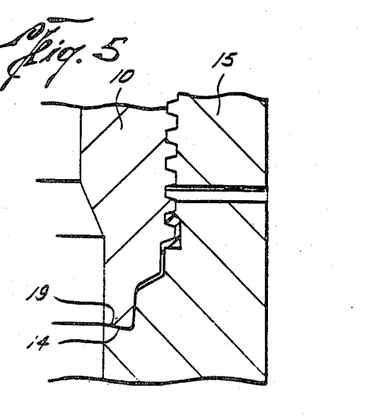

FIGS. 3, 4 and 5 show the makeup of the pipe and box of FIG. 1. In FIG. 3 the pipe 10 has been threaded into the box 15 to the point where the surface 24 overlies the seal 22 to hold it in its groove during final makeup. In FIG. 4 the pipe 10 is shown to be inserted into the box 15 to the extent that the seal 22 has been extruded into the space between the surfaces 24 and 25 and the sealing surfaces 13 and 18 are beginning their makeup. In FIG. 5 the pipe 10 is shown to be in the final fully sealed position in the box with the nose of the pipe in firm engagement with the torque shoulder 18 and the pipe makeup preferably to exert a pressure per square inch against the torque shoulder greater than the pressure within the tubing.

Only the upper portion of pipe 27 is shown in the lower end of the coupling. It will be understood that the pipe 27 is identical to pipe 10 and that the coupling is symmetrical and is identical below the flange 20 to the portion of coupling shown above flange 20.

Figure 6:
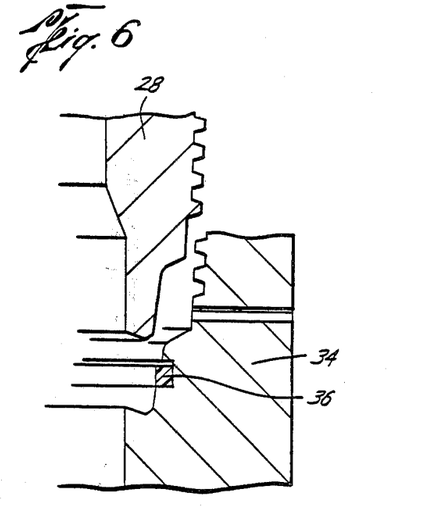
FIGS. 6 and 7 are fragmentary quarter-section views showing sequentially the makeup of the pipe joint of FIG. 2.
Figure 7:
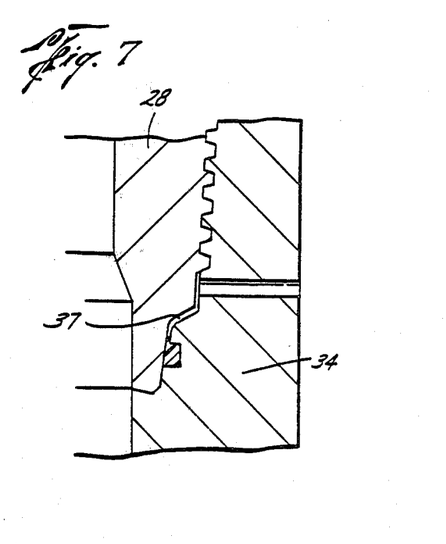

A modified form of the invention is shown in FIGS. 2, 6 and 7. In this form of the invention the pipe 28 is formed with the seal surface 13 and an additional seal surface 29 which cooperates with the end surface 31 of the pipe to form a V-shaped annular member. The surfaces 31 and 29 mate with complementary torque shoulders 32 and seal surface 33 in the box 34. In this form of the invention seals occur at the torque shoulder 31-32, at the seal surface 28 and 33, and at the seal surface 13 and 18. The box is provided with a groove 35 adjacent the upper end of seal surface 18 and again a seal of plastic material 36 is provided in this groove.

The pipe 28 and box 34 are shown in position with the seal surfaces disengaged in FIG. 6 and it is noted that the seal 36 projects beyond the groove 35. As best shown in FIG. 7, as the nose of the pipe moves into the final sealing position the seal material 36 is compressed and expanded and will flow into the juncture between the seal surfaces 13 and 18. As shown in FIG. 7, if a slight spacing is left between the surfaces 13 and 18 on the side of the seal adjacent the threads, as indicated at 37 in FIG. 7, space will be provided for the seal material to flow into on the side of the plastic seal 36 remote from the torque shoulder 31. Thus, if an excess of seal material is present, as suggested in FIG. 7, it will flow into the space 37 and will not interfere with the metal-to-metal seal of surfaces 13 and 18.

In this form of the invention tb would be measured in the coupling immediately adjacent the groove 35 on the side of the seal groove adjacent to the torque shoulder 31 as the largest point of metal-to-metal seal occurs at this point. In the event of failure of all of the metal-to-metal seals, and energizing of the plastic seal 36, the value of tb at the point of seal of the plastic seal would be only slightly larger than the value of tb at the metal-to-metal seal; thus the coupling at the plastic seal would be as resistant to ballooning as would be the pipe 28, and the coupling would not balloon at the point of the plastic seal to any appreciable extent. This is particularly true in view of the fact that the flange 37 is sup-porting the seals and the resistance of the coupling to ballooning in view of the support of the flange would actually be greater than the resistance of the tubing to ballooning.

The t/D of the coupling is preferably equal to that of the pipe. However, it will be appreciated that the t/D ratio of the coupling need only approximate that of the pipe. Where the torque shoulder and associated flange is employed, the t/D ratio of the coupling may be slightly less than that of the pipe at the point of maximum sealing diameter because of the support of the flange for the sealing surface which would make the coupling stronger than the pipe if the t/D ratio of the coupling were equal to that of the pipe. Obviously, the t/D ratio may be slightly greater in the coupling relative to the pipe as this provides additional strength and might be preferred where the torque shoulder and its associated flange are not utilized. Also, in some designs it might be acceptable to have a coupling which had a t/D ratio approaching that of the pipe, but which was slightly less. Therefore, the invention encompasses a provision of a t/D ratio in the coupling which is approximately the t/D ratio of the pipe.

To provide the coupling with tensile strength equal to the pipe, the amount of metal in the coupling measured at the plastic seal groove is preferably at least equal to the amount of metal in the pipe measured at the full wall thickness of the pipe.

Figure 8:
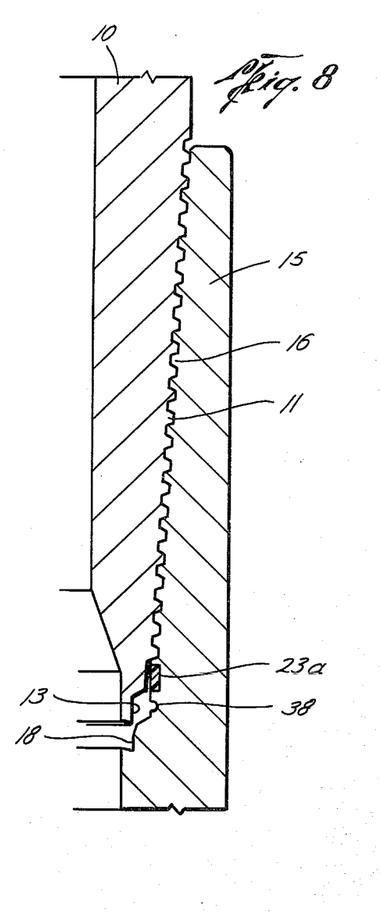
FIGS. 8, 9 and 10 are sectional views of the modified pipe joint of FIGS. 8a and 10a, showing in FIG. 8, the condition of the seal system prior to engagement of the compressible material by the pin thread, and in FIG. 9, the seal material being extruded past the secondary seal during make-up, and in FIG. 10, the fully made-up joint with extruded material contained within the excess seal groove.
Figure 8A:
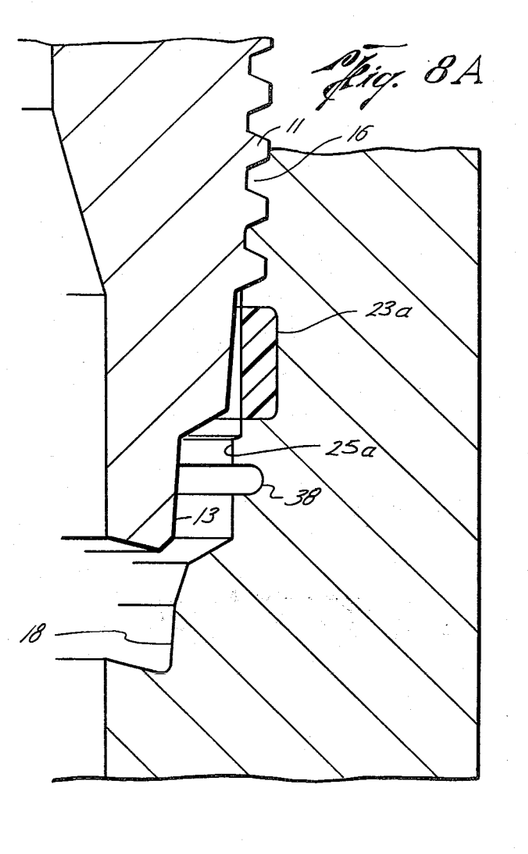
FIG. 8a is a fragmentary sectional view on an enlarged scale of a modified form of pipe joint of FIGS. 8, 9 and 10 in which a compressible member provides a back-up seal; prior to the pin threads engaging the compressible material.
Figure 9:
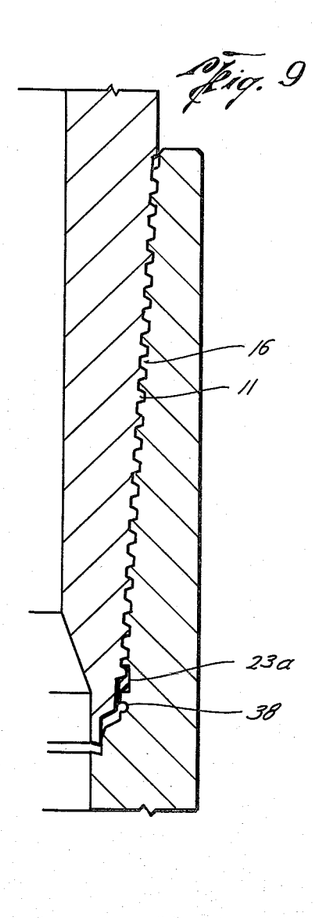
Figure 10:
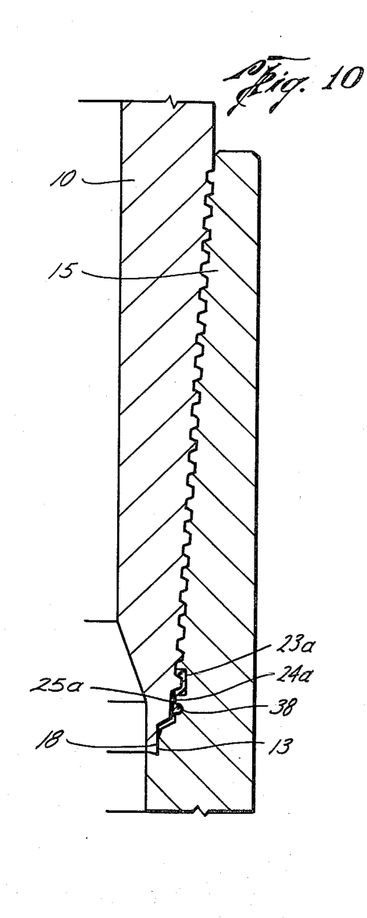

In FIGS. 8 through 10, 8a and 10a, a modified form of joint is shown which employs a compressible back-up seal. In this form of the invention, the box 15 is provided at the last thread with a seal receiving groove 23a and a seal member 22a of compressible material. In some services, the well fluids being produced are such that they can be sealed against only by special materials which are not subject to attack by the well fluids. For instance, it may be desirable to use a seal material primarily or entirely of tetrafluoroethylene, commonly known by its trademark Teflon. Teflon will withstand fluids found in many wells and is a desirable seal material. To function properly, Teflon and like materials should be placed under substantial compression and the design of the joint of FIGS. 8 through 10 provide for using a compressible material which may be placed under substantial compression.

To prevent any substantial extrusion of the compressed material between the threads, they should be carefully formed and the joint should be made up as is customary with lubricant which will fill and seal between the pin and box threads. Preferably, the relationship is such that when the joint is made up, the roots and crests, as well as load flanks of the threads 11 and 16 are in substantial engagement with each other. The stabbing flanks 11a on the pin and the complimentary flanks 16a, on the box will have a few thousandths of an inch clearance. With this relationship and the lubricants normally employed in making up threaded joints for use in petroleum wells, the thread system will not provide an avenue for escape of the seal material 22a when placed in substantial compression and no substantial amount of seal material will be extruded into the thread system during final make-up when the seal material is placed under a substantial compression.

The seal material 22a is slightly larger in volume than the volume of the groove 23a as defined by the pipe and threads extending into the groove 23a when the joint is fully made up. This excess amount of material is extruded between the surface 24a on the pin and the surface 25a on the box as the pin moves towards final sealing engagement as shown in FIG. 9.

Figure 10A:
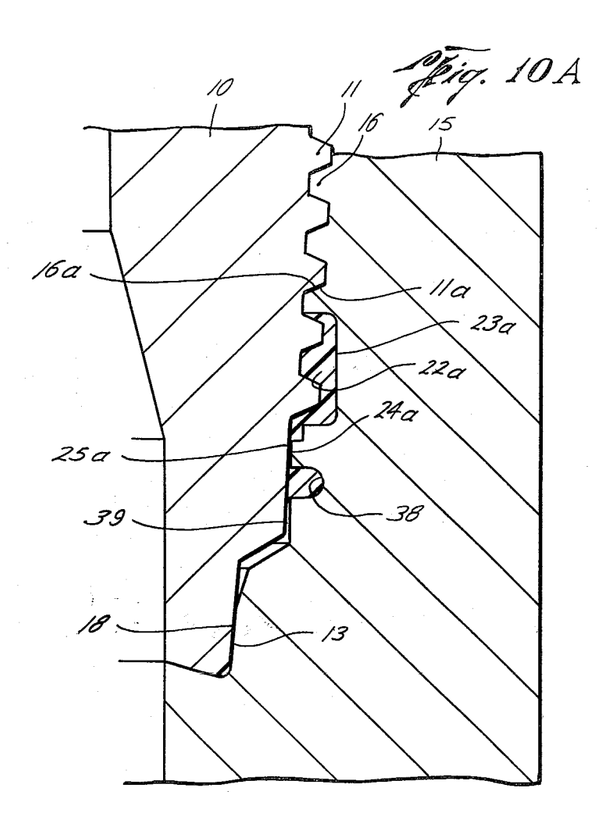
FIG. 10a is a view similar to FIG. 8a showing the pipe joint in fully made-up position with the seal material under compression and with excess seal material which was extruded during make-up contained within an excess seal groove and the primary and secondary metal seals in sealing engagement.

These secondary seal surfaces 24a and 25a are formed on slightly different tapers so that they may engage and seal with each other in a non-critical manner as the pin moves to its final made-up position shown in FIGS. 10 and 10a. Prior to reaching this position, the seal material 22a will have been placed under compression and extruded through the space between the two secondary seal surfaces 24a and 25a as the pin threads move into and reduce the volume within the groove 23a. The excess seal material will extrude between the two secondary seal surfaces and as the pin is rotating relative to the box, the extruded material will also be torn, usually at a number of places.

As the thread system moves toward the final make-up position shown in FIGS. 10 and 10a, the secondary seal surfaces 24a and 25a, will have come into sealing engagement slightly before final make-up of the pin and box and, as additional area of the groove 23a is occupied by the pin thread 11, the seal material 22a will be placed in substantial compression so that it will function with maximum performance as a seal. Also, the surfaces 24a and 25a will now provide not only a seal for confining the compressible material 22a in the groove 23a but will also provide an additional metal-to-metal seal against loss of the fluid being conveyed through the joint.

To guard against the extruded seal material reaching the primary seal provided by the primary seal surface 18 in the box and the primary seal 13 on the pin, means are provided for receiving at least a part of this excess seal material. Preferably, this means is a groove 38 positioned between the secondary sealing surfaces 24a and 25a, and the primary sealing surfaces 13 and 18. Thus, as the material is extruded past the secondary sealing surfaces 24a and 25a, it will gather in the excess seal material groove 38 and be prevented from reaching and interfering with the primary seal surfaces 13 and 18. No particular form of groove 38 is required. Preferably it will receive all extruded material. It is preferably spaced as far as possible from the primary seal surfaces 13 and 18 and more preferably immediately adjacent to the secondary seal surfaces 24a and 25a as shown in the drawings. While a special groove 38 is illustrated, it will be appreciated that this function could be provided by enlarging the space 39 between the pin and box. It has been found that a small groove 38 positioned immediately adjacent the secondary surfaces 24a, and 25a, will adequately receive the extruded material. It is preferable to leave the space indicated at 39 small so that extruded material will tend to collect in the groove 38 instead of passing into the space 39.

In the pipe joint of FIGS. 8 through 10 and 8a and 10a, excess seal material may be used so that the amount of material and the presence of pipe dope is not critical and the seal material as well as any pipe dope which may be trapped within the groove 23a, may be placed under substantial compression after the secondary seal surfaces 24a and 25a are in engagement. These surfaces provide a means for entrapping the seal material to permit it to be placed under compression as well as providing a secondary metal-to-metal seal against loss of fluid being conveyed through the joint. The excess seal groove 38 will trap the extruded seal material and prevent it from reaching the primary seal surfaces 13 and 18. It will be appreciated with this type of seal that a triple seal is provided, that is, the primary seal of surfaces 13 and 18, the secondary seal of surfaces 24a and 25a and the compressed material of seal 22a.

A bleed port such as port 26 (FIG. 1) may be utilized if desired.

The foregoing disclosure and description of the invention are illustrative and explanatory thereof and various changes in the size, shape and materials, as well as in the details of the illustrated construction, may be made within the scope of the appended claims without departing from the spirit of the invention.

What is claimed is:

1. A pipe joint comprising,
a box having a tapered thread and an annular primary seal surface,
an annular seal groove in the box at the last thread,
an annular excess seal groove between the seal groove and primary seal surface,
an annular secondary seal surface between said two grooves,
a pipe having a tapered thread and an annular primary seal surface for sealing engagement with the primary seal surface of the box,
said pipe thread extending into said seal groove when the pipe joint is fully made up,
an annular secondary seal surface on said pipe between the thread and primary seal surface for engaging said secondary seal surface in the box prior to final make-up of the pipe joint, and
an annular seal member of compressible material in said seal groove,
said seal member originally of a volume in excess of the volume of the groove as defined by the pipe when the pipe joint is fully made up,
said box and pipe threads preventing substantial extrusion of said seal therethrough,
said seal during make-up being extruded past said secondary seal surfaces until said surfaces engage to provide a secondary seal and confine said seal for compression during final make-up of the pipe joint,
said excess seal groove receiving at least a part of said extrusion to prevent it from reaching said primary seal surfaces.

2. The pipe joint of claim 1 wherein said seal member is primarily Teflon.

3. The pipe joint of claim 1 wherein said secondary seal surfaces are of a slightly different taper.

4. The pipe joint of claim 1 wherein said secondary seal surfaces are on slightly different tapers and the seal member is primarily Teflon.

5. A pipe joint comprising,
a box having a tapered thread and an annular primary seal surface,
an annular seal groove in the box at the last thread,
an annular excess seal groove between the seal groove and primary seal surface,
an annular secondary seal surface between said two grooves,
a pipe having a tapered thread and an annular primary seal surface for sealing engagement with the primary seal surface of the box,
said pipe thread extending into said seal groove when the pipe joint is fully made up,
an annular secondary seal surface on said pipe between the thread and primary seal surface for engaging said secondary seal surface in the box prior to final make-up of the pipe joint, and
an annular seal member of compressible material in said seal groove,
said seal member originally of a volume in excess of the volume of the groove as defined by the pipe when the pipe joint is fully made up,
said box and pipe threads preventing substantial extrusion of said seal therethrough,
said seal during make-up being extruded past said secondary seal surfaces until said surfaces engage to provide a secondary seal and confine said seal for compression during final make-up of the pipe joint,
said excess seal groove receiving at least a part of said extrusion to prevent it from reaching said primary seal surfaces, said box and pipe having the following approximate relationship:

$$tb/Db = tp/Dp$$

wherein, tb is the thickness of the box wall at the largest diameter point of sealing engagement between said sealing surfaces, Db is the outer diameter of the box at the point where tb is measured, tp is the full wall thickness of the pipe, and Dp is the diameter of the pipe at the full wall thickness.

6. The pipe joint of claim 5 wherein said seal member is primarily Teflon.

7. The pipe joint of claim 5 wherein said secondary seal surfaces are on slightly different tapers.

8. The pipe joint of claim 5 wherein said secondary seal surfaces are on slightly different tapers and the seal member is primarily Teflon.

9. The pipe joint of claim 5 wherein a step surface is provided in the box and on the pipe between the respective primary sealing surfaces and tapered threads, and said largest diameter point of sealing engagement between the primary sealing surfaces is of smaller diameter than the diameter of the smallest box thread.

10. The pipe joint of claim 5 wherein a bleed port is provided in the box adjacent the smallest diameter thread on the thread side of all seals between the pipe and box to prevent an effective seal being formed in the threads.

11. The pipe joint of claim 5 wherein the box is provided with a torque shoulder engaging the end of the pipe and when the joint is fully made up, the induced pressure between the end of the pipe and the torque shoulder resulting from make-up of the joint is greater than the internal pressure being sealed against.

12. The pipe joint of claim 5 wherein the box is provided in a coupling having identical box sections and internal torque shoulders forming with the primary seal surfaces an angle of less than 90° engaging complimentary surfaces on the pipes.

13. A pipe joint comprising, a box having a tapered thread and an annular primary seal surface, an annular seal groove in the box at the last thread, an annular excess seal groove between the seal groove and primary seal surface, an annular secondary seal surface between said two grooves, a pipe having a tapered thread and an annular primary seal surface for sealing engagement with the primary seal surface of the box, said pipe thread extending into said seal groove when the pipe joint is fully made up, an annular secondary seal surface on said pipe between the thread and primary seal surface for engaging said secondary seal surface in the box prior to final make-up of the pipe joint, and an annular seal member of compressible material in said seal groove, said seal member originally of a volume in excess of the volume of the groove as defined by the pipe when the pipe joint is fully made up, said box and pipe threads preventing substantial extrusion of said seal therethrough, said seal during make-up being extruded past said secondary seal surfaces until said surfaces engage to provide a secondary seal and confine said seal for compression during final make-up of the pipe joint, said excess seal groove receiving at least a part of said extrusion to prevent it from reaching said primary seal surfaces, said box and pipe having the following approximate relationship:

$$tb/Db = tp/Dp$$

wherein, tb is the thickness of the box wall at the largest diameter point of sealing engagement between said sealing surfaces, Db is the outer diameter of the box at the point where tb is measured, tp is the full wall thickness of the pipe, and Dp is the diameter of the pipe at the full wall thickness, and the area of the wall of the box at the last full thread thereof being equal to or greater than the area of the wall of the pipe at the full wall thickness measured in planes normal to the joint axis.

14. The pipe joint of claim 13 wherein said seal member is primarily Teflon.

15. The pipe joint of claim 13 wherein said secondary seal surfaces are on slightly different tapers.

16. The pipe joint of claim 13 wherein said secondary seal surfaces are on slightly different tapers and the seal member is primarily Teflon.

17. The pipe joint of claim 13 wherein a step surface is provided in the box and on the pipe between the respective primary sealing surfaces and tapered threads, and said largest diameter point of sealing engagement between the primary sealing surfaces is of smaller diameter than the diameter of the smallest box thread.

18. The pipe joint of claim 13 wherein a bleed port is provided in the box adjacent the smallest diameter thread on the thread side of all seals between the pipe and box to prevent an effective seal being formed in the threads.

19. The pipe joint of claim 13 wherein the box is provided with a torque shoulder engaging the end of the pipe and when the joint is fully made up, the induced pressure between the end of the pipe and the torque shoulder resulting from make-up of the joint is greater than the internal pressure being sealed against.

20. The pipe joint of claim 13 wherein the box is provided in a coupling having identical box sections and internal torque shoulders forming with the primary seal surfaces an angle of less than 90° engaging complimentary surfaces on the pipes.

* * * * *

UNITED STATES PATENT AND TRADEMARK OFFICE
Certificate

Patent No. 4,433,862                                      Patented February 28, 1984

George M. Raulins and George G. Grimmer

Application having been made by George M. Raulins and George G. Grimmer, the inventors named in the patent above identified, and Otis Engineering Corp., the assignee, for the issuance of a certificate under the provisions of Title 35, Section 256, of the United States Code, adding the name of James Lee Peterson as a joint inventor, and a showing and proof of facts satisfying the requirements of the said section having been submitted, it is this 18th day of Sept., 1984, certified that the name of the said James Lee Peterson is hereby added to the said patent as a joint inventor with the said George M. Raulins and George G. Grimmer.

Fred W. Sherling,
*Associate Solicitor.*